March 5, 1968  J. T. NAFF  3,372,296
ARC PLASMA ELECTRODE PAIR HAVING A VENTURI-SHAPED CONFIGURATION
Filed April 4, 1967
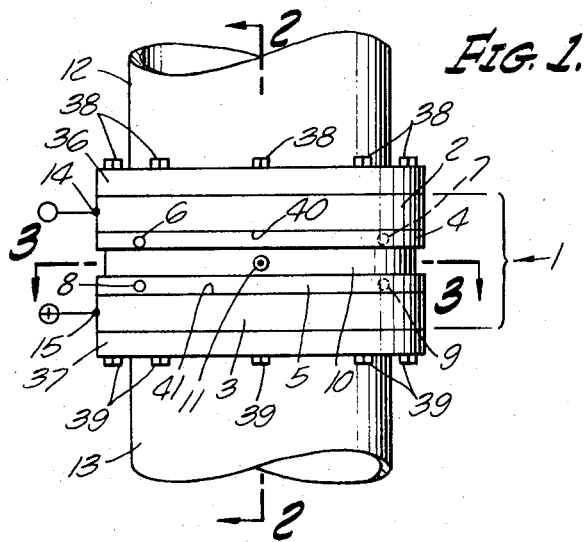
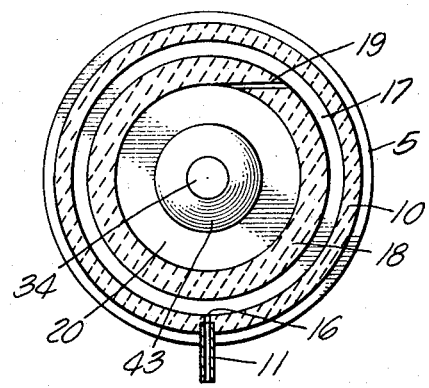
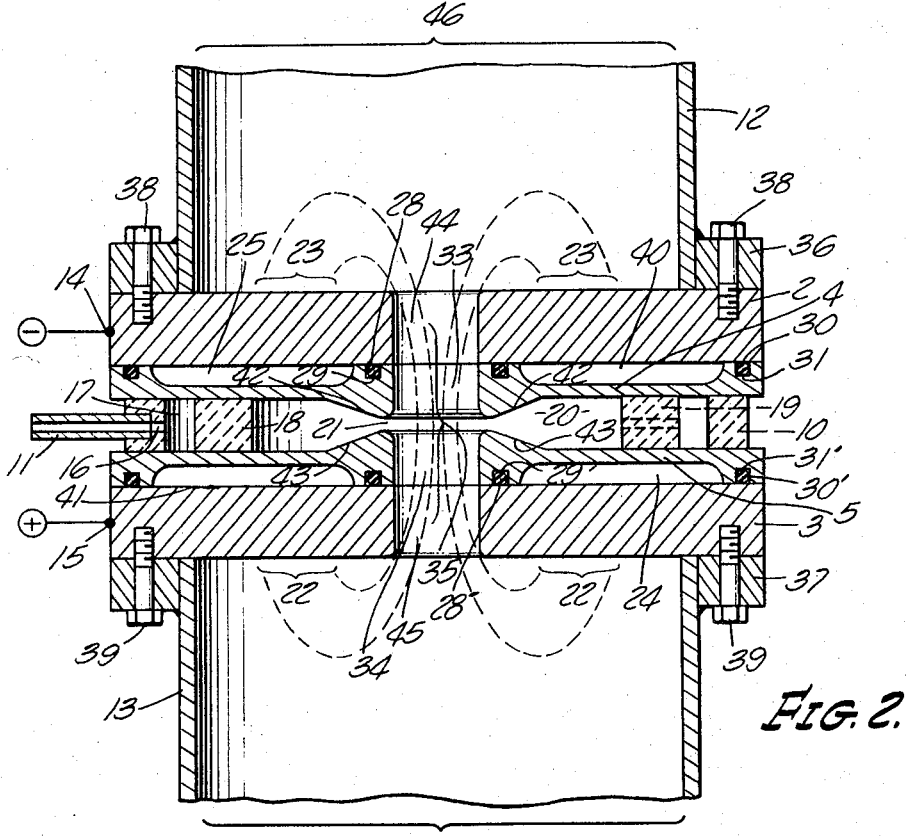
JOHN TOM NAFF
INVENTOR.
BY 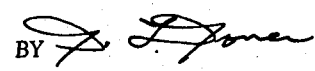
AGENT United States Patent Office 3,372,296
Patented Mar. 5, 1968

3,372,296
ARC PLASMA ELECTRODE PAIR HAVING A VENTURI-SHAPED CONFIGURATION
John Tom Naff, Costa Mesa, Calif., assignor to Automatic Fire Control Inc., South El Monte, Calif., a corporation of California
Filed Apr. 4, 1967, Ser. No. 628,355
5 Claims. (Cl. 313—231)

ABSTRACT OF THE DISCLOSURE

This invention relates to an arc reactor electrode configuration useful in generating an arc suitable for heating substances by passage through the arc plasma. A simple, replaceable parallel annular plate anode and cathode pair can be quickly replaced on wear.

---

This invention teaches improvements in the plasmajet reactor construction relating to a symmetrical electrode configuration. The new and improved electrode configuration is particularly adapted to processing large masses of chemicals in reactions, and for altering the physical properties of substances at high temperature.

It is an object of this invention to provide an inexpensive anode-cathode electrode pair configuration easily replaced in a high temperature arc chemical reactor.

An additional object of this invention is to provide an anode-cathode electrode pair configuration having a long arc process lifetime, with freedom from erosion.

Another object of this invention is to provide an arc attachment means conductive to long electrode pair arc process lifetime.

Still another object of this invention is to provide an electrode pair configuration for arc process reactors which is relatively inexpensive and easily fabricated.

A further object of this invention is to provide a simplified, efficient arc electrode means suitable for continuously processing chemical reactors and physical modifications in high temperature plasma jets.

Other objects and advantages of this invention are taught by reference to the following description and claims.

The description and claims are to be read and considered in view of the following drawings, in which:

FIGURE 1 is an elevational perspective view of the arc electrode configuration in a reactor.

FIGURE 2 illustrates the sectional view 2—2 through FIGURE 1.

FIGURE 3 illustrates the sectional view 3—3 through FIGURE 1.

Referring to FIGURE 1 in detail, the plasma jet reactor has the arc reactor electrode configuration 1. The electrode configuration 1 is shown to have the plane plate electrodes 2 and 3; each one of the electrodes 2 and 3 are shown to have one face, 40 and 41 respectively, in adjacent opposed parallel planes. A pair of opposed parallel coelectrodes 4 and 5 are shown sealed to the respective faces 40 and 41 of the respective plate electrodes 2 and 3. The coolant fluid inlets 6 and 8 provide passageway for coolant, typically water, into the co-electrodes 4 and 5 respectively. The coolant outlets 7 and 9 for co-electrodes 4 and 5 respectively provide for coolant exit on the opposed diameters of the respective electrodes. The outer sealant spacer ring 10 is electrically non-conducting, high melting, and is typically ceramic, and is compressively sealed to the co-electrodes 4 and 5 to form a spacer ring. A reactant inlet tube 11 is shown leading radially into the outer spacer ring 10. The plasma jet reactor product output tubes 12 and 13 are shown secured to the plane plate electrode 2 and 3 by the respective flanges 36 and 37. Flanges 36 and 37 are welded or threaded to the respective output tubes 12 and 13. Fasteners 38 secure the output tube 12 and flange 36 combination to the plate electrode 2. Fasteners 39 secure the output tube 13 and flange 37 combination to the plate electrode 3. The electrode 2 is shown connected to the direct current voltage source at 14 and the electrode 3 is shown connected to the opposite direct current voltage source at 15.

Referring to FIGURES 2 and 3 together, the electrode configuration 1 is shown in great detail in sectional view. The plane plate electrodes 2 and 3 are shown secured to the respective flanges 36 and 37 by the respective fasteners 38 and 39. The co-electrodes 4 and 5 are shown to have annular recessed fluid coolant passages or openings 25 and 24 respectively adjacent the planar first faces 40 and 41 of the plane plate electrodes 2 and 3 respectively. The annual passages or openings 25 and 24 allow the flow of water, typically to cool the electrodes 2 and 3 during heat generation when operating electrically. The soft circular copper gaskets or O-rings 28 and 28' seated in the grooves 29 and 29', and the soft circular copper gaskets 30 and 30' seated in the grooves 31 and 31'; seal the respective co-electrodes 4 and 5 to their respective plate electrodes 2 and 3. The gaskets 28, 28', 30 and 30' seal and protect against coolant water leakage.

The co-electrodes 4 and 5 each have a centrally located positively sloping arcuate contour respectively shown as 42 and 43 in FIGURE 2.

FIGURE 3 shows a plan view of the upwardly sloping arcuate contour 43. The centrally located arcuate contours 42 and 43 are adjacent the centrally located openings 33 and 34 in the co-electrodes 4 and 5 respectively. The openings 33 and 34 are coaxial and adjacent the openings 44 and 45 in the plate electrodes 2 and 3 respectively. The openings 33, 34, 44 and 45 are circular openings essentially the same diameter and are coaxially aligned to form the central electrode opening or passageway 35.

The centrally located positively sloping arcuate contours 42 and 43 can be contoured into a standard venturi shape, when the opposed cross sectional contours 42 and 43 are located in opposed positions as shown in FIGURE 2. The circular venturi nozzle opening 21 is thus shown exiting into the opening 35. The circular chamber 20 represents the upstream converging opening which opens to the ring or circular nozzle opening 21 and then into the opening 35.

The ceramic, non-electrically conducting, high melting sealant spacer rings 10 and 18 of equal heights are shown in elevation view in FIGURE 2 and in plan view in FIGURE 3. The rings 10 and 18 are separated and concentrically located around the opening 35, having an annular opening 17 located between the rings. The reactant inlet tube 11 is secured to the outer sealant spacer ring 10 and confronts an opening 16 which pierces the ring 10. The opening 19 completely pierces the inner sealant spacer ring 10, the opening 19 being disposed tangentially to the inner circumference of the ring 10, as shown in FIGURE 3.

The openings 46 and 47 represent the exit diameters of the respective output tubes 12 and 13.

The arc reactor electrode configuration 1 is a pair of opposed, axially concentric electrode combinations.

Typically the arc reactor electrode configuration 1 may operate at the 100 kilowatt D.C. power level. At such an operating power level the copper, tungsten or iron electrodes 2 and 3 are about ½ inch thick plates, with openings 44 and 45 about ¼ inch diameter. The spacer rings 10 and 18 are about ¼ inch high, as shown in plan view in FIGURE 2. The circular nozzle opening 21 is about ⅛ inch side at the smallest dimension. The outlet tubes 12 and 13 have openings 46 and 47, which are typically 2 to 2½ inch diameter.

Operating at hydrogen and hydrocarbon gas inputs ambient arc reactor pressure of 4–5 atmospheres, the reactor operates at 350–400 volts D.C. and the respective current input of 285 to 250 amperes. Operating at a nitrogen gas input of 4–5 atmospheres pressure, the reactor can absorb power at the level of 200 volts and 500 amperes. In a 4–5 atmosphere pressure of argon gas, the reactor can operate at a power input of 80–100 volts and 1000 amp. The arc has the economic and performance advantage of being operable on both A.C. and D.C. power.

In practice to operate the arc reactor, first establish gas flow, then start power supply, and establish the arc between electrodes. The arc may be started by inserting and quickly drawing a rod through the arc opening 35. The arc generated on operation of the electrode configuration 1 forms attachment areas 22 and 23 on the rear surfaces of the plate electrodes 3 and 2. The attachment areas 22 and 23 are typically annular rings, as shown in elevation view in FIGURE 2. The arc lines are concentrated in the opening 35. In principle the attachment areas 22 and 23 form on the plate electrode faces opposite the plate faces 41 and 40 repsectively.

The arc electrode configuration has the important economic advantages of easy and rapid fabrication from copper metal or the like, since only very simple machining is required. Hence, the initial fabricating cost and the time required to replace a pair of worn arc electrode configurations are relatively small.

The plasma jet arc reactor electrode configuration may be used in thermally forming acetylene from methane. Likewise, the electrode configuration may be used to thermally react hydrocarbon feed stocks. The direct reduction of iron oxide ores, rare earth oxides and other metal oxides to their respective metals may also be carried out in a hydrogen gas atmosphere which both reduces and transports the metal oxide reactant and product through the reactor.

Obviously many modifications and variations of the improvements in arc reactor electrodes are possible within the scope of this invention as disclosed and claimed, and this invention may be practiced otherwise than as specifically described.

I claim:

1. In a plasma jet reactor, an electrode configuration comprising: a pair of plane plate electrodes, each one of said plate electrodes having one face thereof located in an adjacent opposed parallel plane and having an opening extending completely through said electrode normal to the plate plane, and each of said openings coaxially located on a line of centers; a pair of fluid cooled co-electrodes, each one of said pair of co-electrodes having an annular recessed fluid coolant passage adjacent a planar first face of said co-electrode, and a co-electrode planar second face parallel to said planar first face, said second face having a centrally located one-half of a venturi shaped contour symmetrically circularly adjacent a centrally located opening extending completely through said co-electrode, said opening normal to said planar first face, each one of said co-electrodes having a planar first face sealed to one of a pair of adjacent opposed parallel plane plate electrode faces, and said co-electrode opening coaxially centered with said plate opening; a pair of electrically non-conducting, high melting, sealant spacer rings of equal heights, co-planarly and concentrically located in a spaced, gas-tight relationship contiguous the pair of confronting co-electrode planar faces, the outer sealant spacer ring having a material inlet opening radially extending completely through said ring wall from the ring exterior, and the inner sealant ring having an opening extending tangentially completely through the inner ring wall parallel to said co-electrode second planar face.

2. In the electrode configuration of claim 1, the modification wherein the combination of the plate electrode and the co-electrode have arcuated sloping contour at the central coaxial opening.

3. In the electrode configuration of claim 1, the modification wherein the electrode configuration is a highly thermally conductive copper base metal.

4. In a plasma jet having a pair of opposed parallel, plane plate metal electrodes, each one of the electrodes having a centrally disposed opening completely piercing the plate plane and each one of said openings located on a cooperative single line of center, the cooperative electrodes pair comprising: a pair of fluid cooled co-electrodes, each one of said pair of co-electrodes having an annular recessed fluid coolant passage adjacent a planar first face of said co-electrode, and a co-electrode planar second face parallel to said planar first face, said second face having a circularly symmetrical one-half of a venturi shaped contour symmetrically circularly adjacent a centrally located opening extending completely through said co-electrode, said opening normal to said planar first face, each one of said co-electrodes having a planar first face sealed to one of a pair of adjacent opposed parallel plane plate electrode faces, and said co-electrode opening coaxially centered with said plate opening; a concentric coplanar pair electrically non-conducting, high melting, sealant spacer rings of equal height, contiguously sealed to the opposed co-electrodes, the outer sealant spacer ring having a material inlet opening extending completely through said ring from the ring exterior, and the inner sealant ring having an opening extending tangentially completely through the inner ring wall parallel to said co-electrode second planar face.

5. In a co-electrode configuration of claim 4, the modification wherein the co-electrode is a highly thermally conductive copper base metal.

References Cited

UNITED STATES PATENTS

| | | | |
|---|---|---|---|
| 3,146,371 | 8/1964 | McGinn | 315—111 |
| 3,313,707 | 4/1967 | Amsler | 315—111 |

JAMES W. LAWRENCE, Primary Examiner.

STANLEY D. SCHLOSSER, Examiner.

S. A. SCHNEEBERGER, Assistant Examiner.